May 20, 1969            G. KOOCH            3,444,807
DRIVE MEANS FOR DUPLICATING APPARATUS USING MASTER CARDS
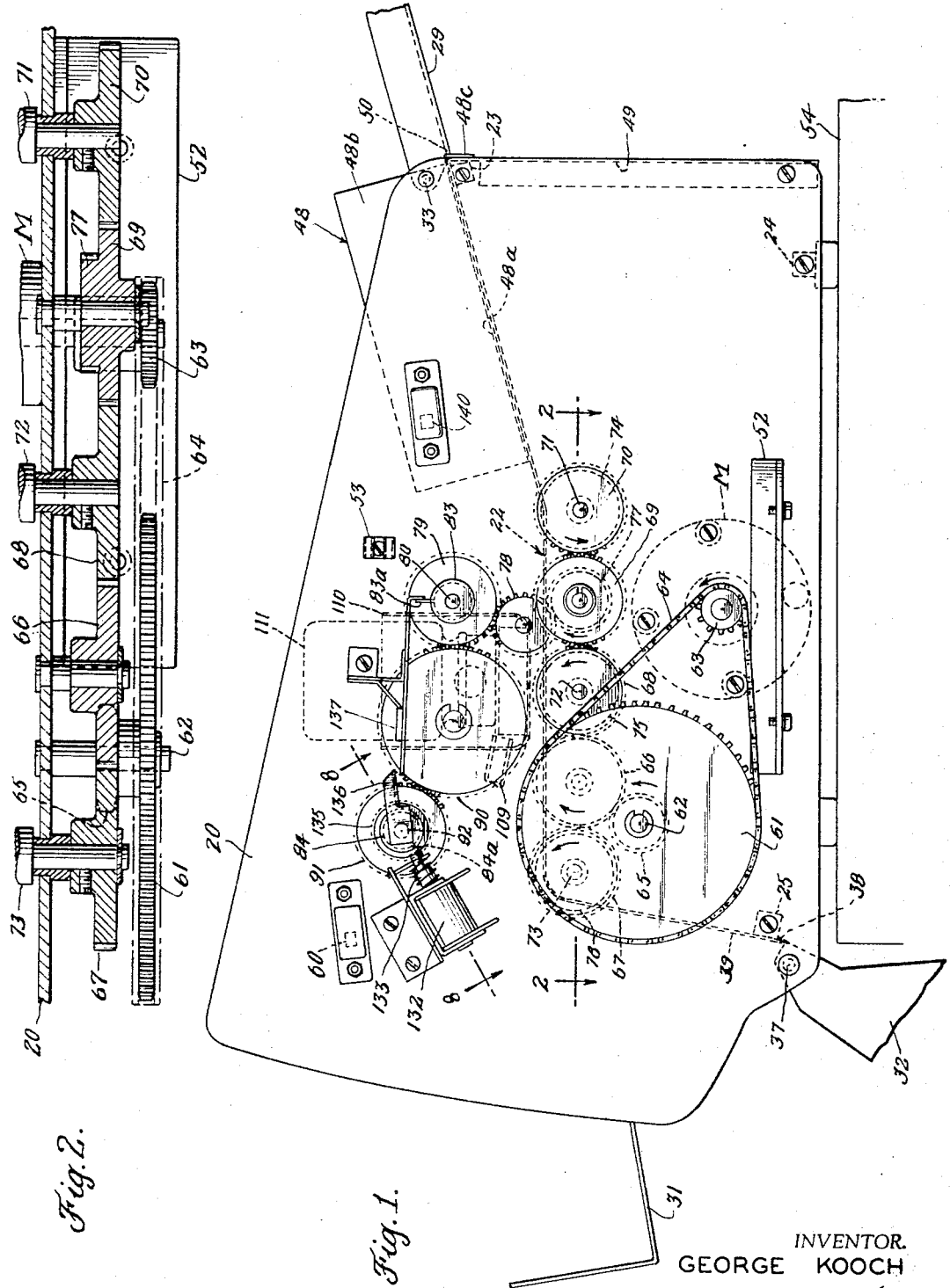
INVENTOR.
GEORGE KOOCH
BY Howson & Howson
ATTYS.

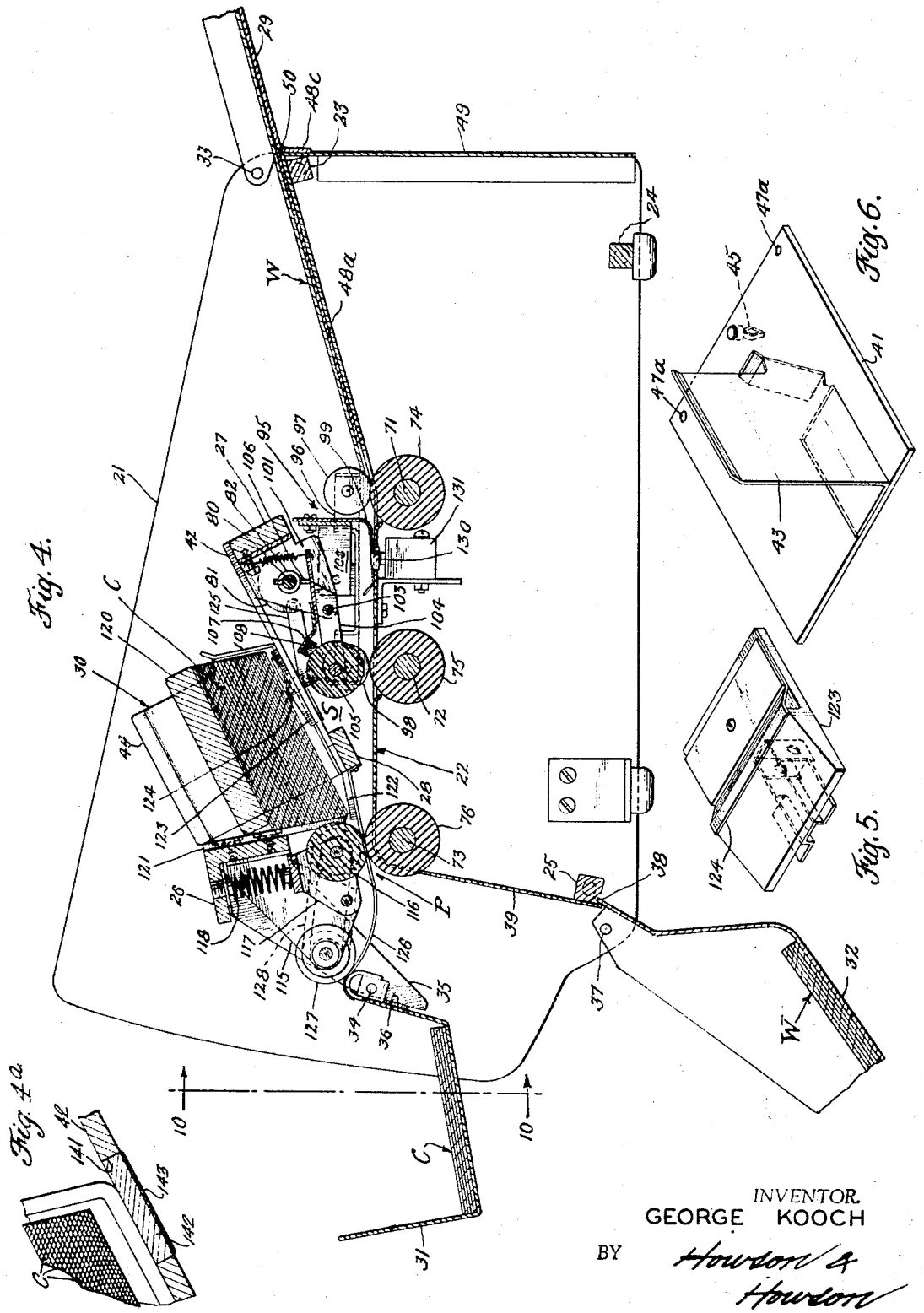

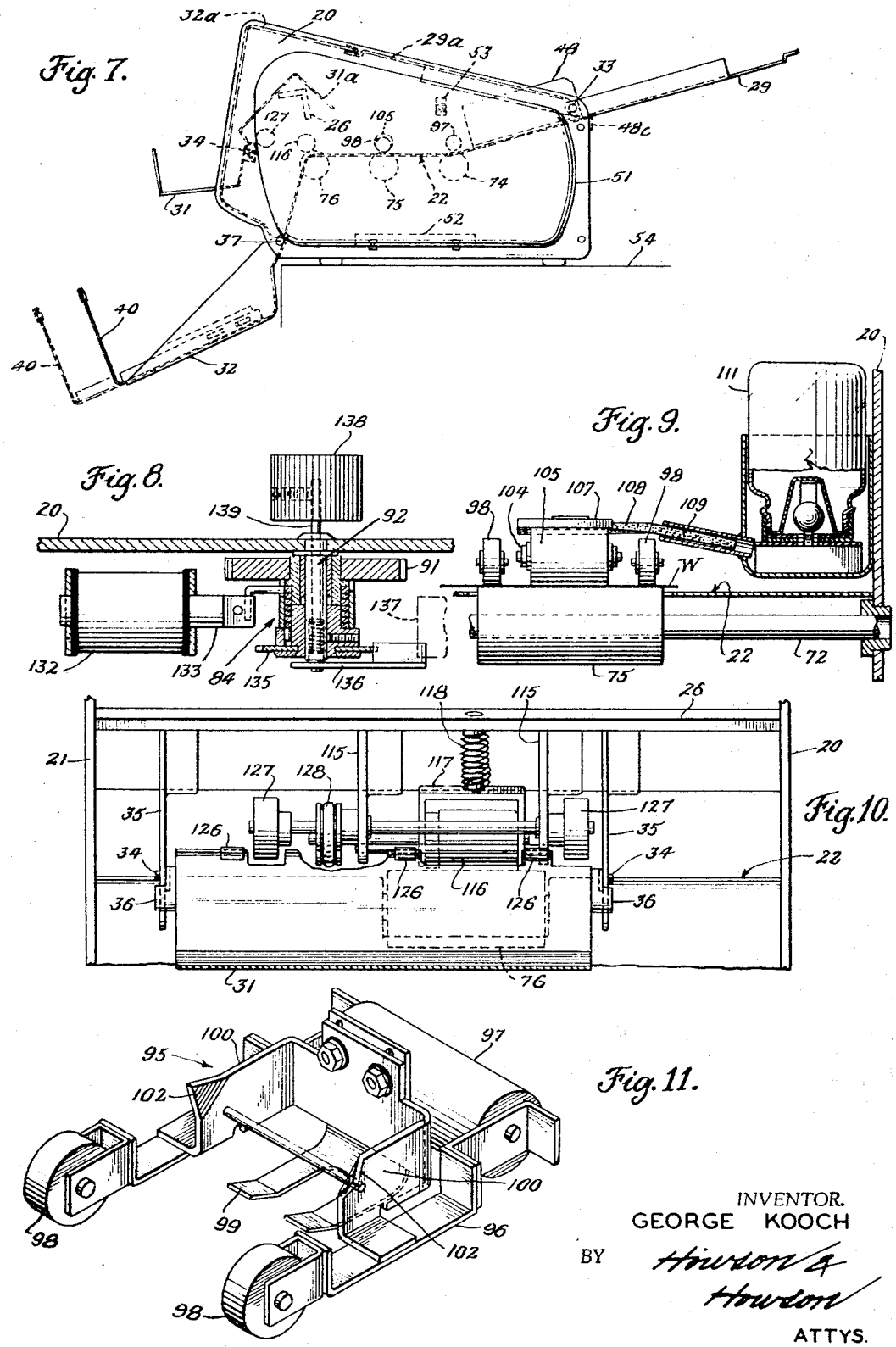

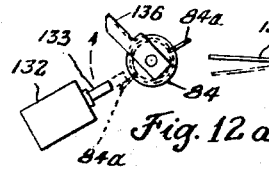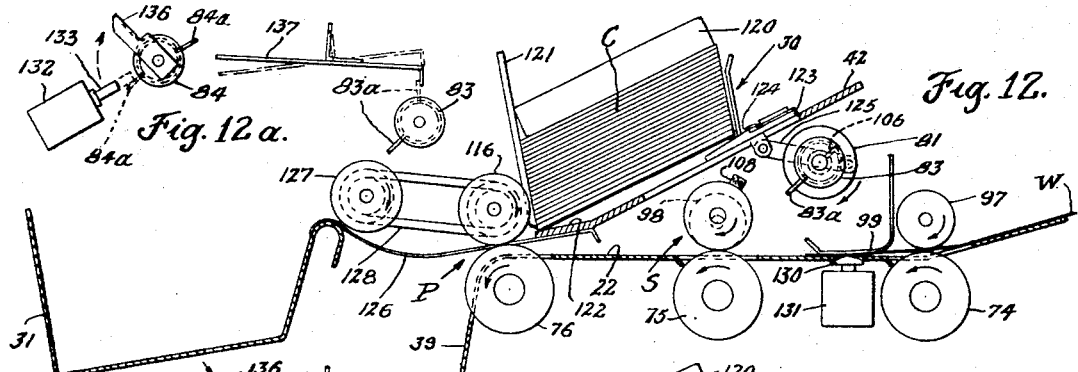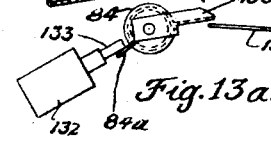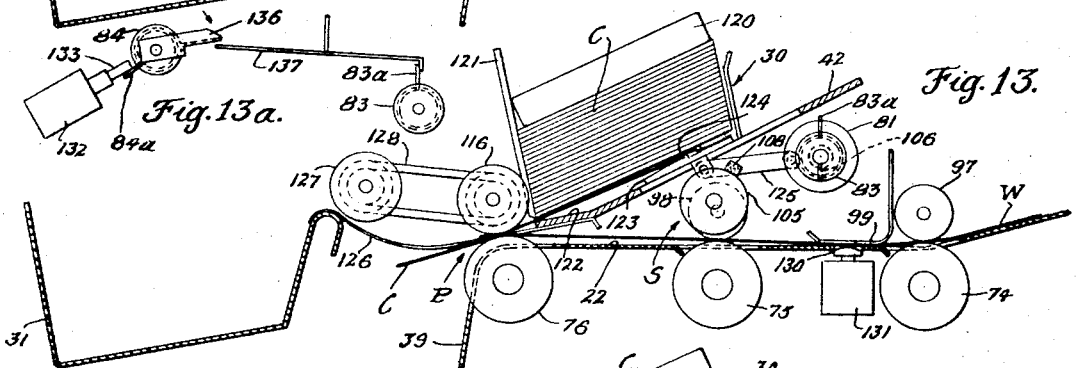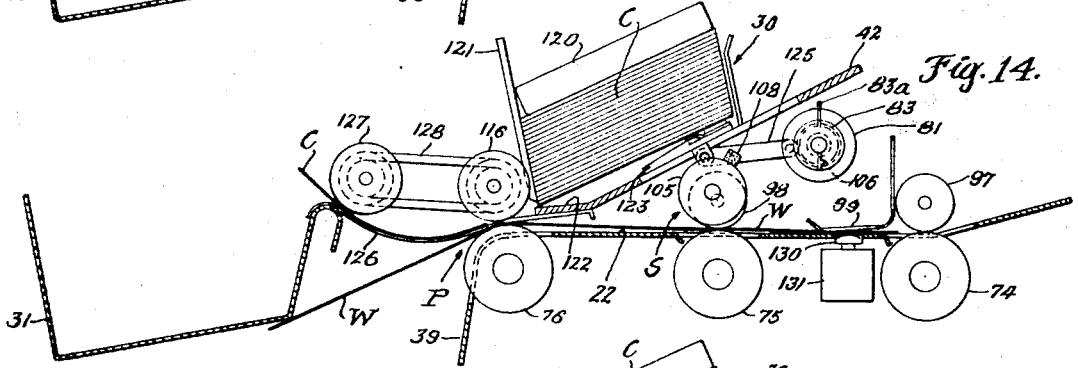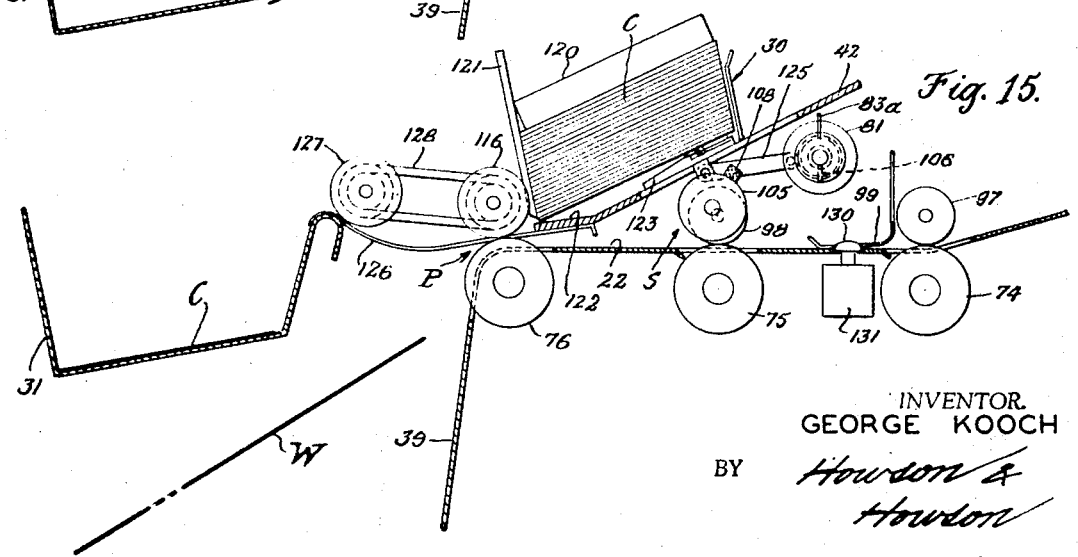
INVENTOR.
GEORGE KOOCH
ATTYS.

United States Patent Office 3,444,807
Patented May 20, 1969

3,444,807
DRIVE MEANS FOR DUPLICATING APPARATUS USING MASTER CARDS
George Kooch, Philadelphia, Pa., assignor to Scriptomatic, Inc., Philadelphia, Pa., a corporation of Delaware
Filed May 4, 1966, Ser. No. 547,634
Int. Cl. B41l 47/46
U.S. Cl. 101—53               5 Claims

ABSTRACT OF THE DISCLOSURE

Duplicating apparatus utilizing the hectograph process for transferring printed matter from a master card to a work piece in which the initial feed of a work piece into the machine actuates the feed mechanism for feeding the master card. Two separate clutches are provided in the drive mechanism for feeding the master card, the first of which is caused to become engaged upon entry of a work piece into the machine, and through an adjustable time delay actuates the second clutch which initiates the feed of the master card.

---

This invention relates to new and useful duplicating machines and more particularly to the type of duplicating machine in which printed matter, such as a name and address, is transferred from a master card to an envelope, wrapper or sheet of paper, hereinafter referred to as a work piece.

The transfer of the printed matter is accomplished by the conventional hectograph process wherein a solvent moistened work piece is brought into pressure contact with a master card to transfer the printed matter from the master card to the work piece.

The master cards are master records cards arranged in a particular desired order such as by address location, alphabetically, date, etc., and it is important to maintain this order and to prevent damage to the cards when they are run through the duplicating machine.

The present invention is concerned with unique improvements in such duplicating machines, both in the mechanism for transferring printed matter from the master cards to the work pieces and in the physical relationship and construction of certain components of the invention. The duplicating machine of this invention is a modification of the machine disclosed in Patent No. 3,230,871, dated Jan. 25, 1966, assigned to the assignee of this application and provides a more compact, less expensive yet efficient version of the machine of Patent No. 3,230,871, designed to accomplish particular duplicating functions as set forth hereinafter.

A primary object of the invention is to provide a duplicating machine for effectively transferring printed matter from such master cards to work pieces, which is of very compact form, of exceedingly simple construction, and which is portable for use as a table or desk model.

Another object of the invention is the provision of a duplicating machine in which the simple act of feeding a work piece into the machine either by hand or by an automatic feeder automatically controls the feed of a master card to a printing station in proper printing relation with the work piece through the employment of a minimum number of simple parts.

Another object of the present invention is to provide a relatively simple, inexpensive duplicating machine in which the operator can selectively skip reproducing particular master cards if desired and can determine which cards should not be duplicated by a coding on the lower surface of the card.

Still another object of the invention resides in the provision of a simple trip device adapted to be set to various positions of adjustment to vary the area at which the printed matter is transferred to the work piece.

A further object of the invention resides in the novel construction and arrangement of trip actuated clutch means for controlling feed of the master cards and for controlling the actuation of a moistening device for applying a solvent to the work piece in the area where printing is to occur.

Another object resides in the novel arrangement of the drive system of the machine, including the clutch and trip mechanism, in a concentrated, readily accessible area at the side of the machine.

Another object of the invention is the provision of a nip roll assembly for the work piece which is readily removable as a unit and reinsertable into operative position in a simple manner.

Still another object is the provision in a machine of the character described of a hinged work piece table and a hinged collecting hopper for the printed work pieces constructed and arranged to constitute a closure cover for the machine when it is not in use.

Other objects have to do with features of construction resulting in a duplicating machine of minimum size and in the ready accessibility of the interior parts for inspection and to enable the machine to be quickly put back into running order in the event that it becomes jammed.

These and other objects of the present invention and the various features of operation and construction thereof are hereinafter more fully set forth and described with reference to the accompanying drawings, in which:

FIG. 1 is a side elevational view of a duplicating machine constructed in accordance with the invention with the side cover removed;

FIG. 2 is an enlarged fragmentary plan section taken on the line 2—2 of FIG. 1;

FIG. 4 is a longitudinal section taken approximately on the line 4—4 of FIG. 3;

FIG. 4a is a fragmentary longitudinal sectional view taken on the line 4a—4a of FIG. 3;

FIG. 5 is an isometric view of a master card stripper plate;

FIG. 6 is an isometric view of a readily removable plate and master card stack wall;

FIG. 7 is a side view of the machine, on a small scale, resting on a table with certain parts shown in full lines in their operating positions and in dot and dash lines in their other or closed positions;

FIG. 8 is a fragmentary section taken on the line 8—8 of FIG. 1 illustrating a clutch detail;

FIG. 9 is a detail view of a moistening device for applying a solvent to the work piece;

FIG. 10 is a fragmentary front view of certain parts taken as indicated by the line 10—10 in FIG. 4;

FIG. 11 is an isometric view of a readily removable and insertable nip roll unit;

FIG. 12 is a diagrammatic view illustrating the first stage of operation of the machine with the work piece entering the duplicating machine.

FIG. 12a is a diagrammatic view illustrating the positions of parts of a trip mechanism when the machine is in the operative position shown in FIG. 12;

FIGS. 13 and 13a are diagrammatic views illustrating the next stage of operation; and FIGS. 14 and 15 are diagrammatic views illustrating further stages of operation.

Figure 3:
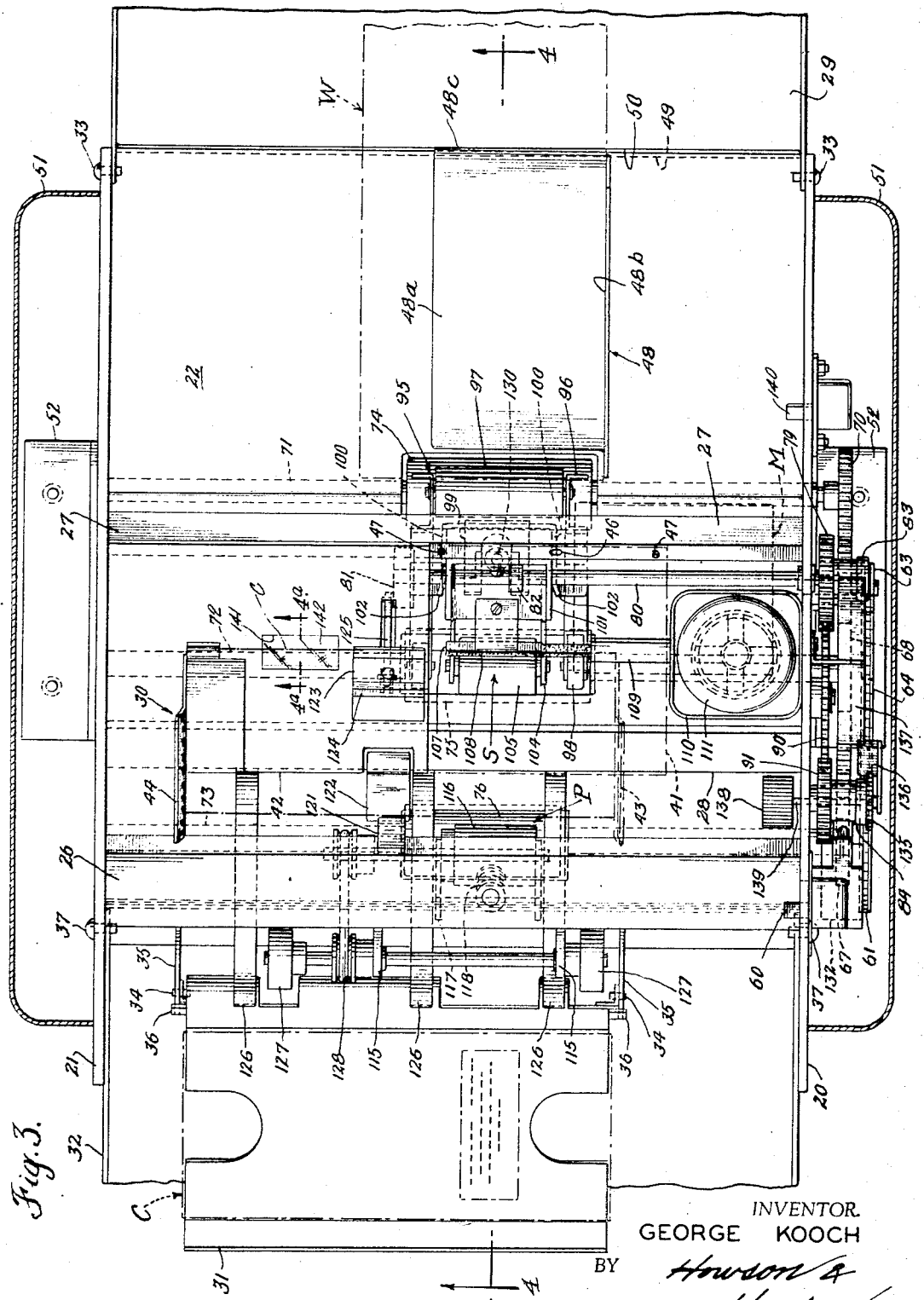
FIG. 3 is a plan view of FIG. 1 with the side covers appearing in section.

Before describing in detail the operating parts of the machine and their functions, the general physical relationship of certain components of the invention will be described in order to more fully understand the advantages obtained thereby.

Referring to the drawings, my improved duplicating machine comprises in general a frame structure including side plates 20 and 21, a deck plate 22, cross bar tie members 23–28; a hinged table 29 for supporting the work pieces W; a solvent-applying station S; a card carrier 30 for a stack of master cards C; a printing or transfer station P; a hinged collecting tray 31 for the master cards; and a hinged collecting hopper 32 for the printed work pieces.

The work piece table 29 is pivoted at 33 to the side plates 20 and 21 and when in operating position, it is inclined at an angle corresponding to the upward inclination of the deck plate 22.

The card collecting tray 31 is pivoted at 34 to brackets 35 secured to the cross bar 26. The tray 31 is provided with tabs 36 which engage the brackets 35 to limit its downward position.

The collecting hopper 32 is pivoted at 37 to the side plates 20 and 21 at a level below the card collecting tray 31 and is limited in its downward position by engagement of its edge 38 in back of the downwardly extending wall 39 of the deck plate 22 (FIG. 4). This hopper is provided with an extensible wall member 40 to enable adjustment of the hopper size to accommodate work pieces of various sizes as indicated in dot and dash lines in FIG. 1.

The card carrier 30 for the master cards C comprises base plates 41 and 42 having upright side wall members 43 and 44. The base plates 41 and 42 are supported on the cross bars 27 and 28. It is pointed out that the base plate 41 shown in dot and dash lines in FIG. 3 and in detail in FIG. 6 is provided with a downwardly extending snap member 45 adapted to snap into hole 46 provided in the cross bar 27. The cross bar is provided with positioning pins 47, 47 fitting holes 47a, 47a in the base plate. Thus, this base plate can be readily detached to expose and give access to the moistening unit of the solvent-applying station S as clearly seen in FIG. 3.

In the embodiment of the invention illustrated in the drawings, the work pieces or envelopes are fed into the machine by hand by placing the work piece lengthwise on the table 29 and by guiding it against the side guide member 48. This member has a base portion 48a which rests on the upwardly inclined portion of the deck 22, an upwardly extending side portion 48b for guiding the work piece into the machine and a downwardly extending lip 48c extending in back of the rear casing wall 49 as shown in FIGS. 1, 3 and 4. When the hinged table 29 is swung to its work supporting position as shown in FIGS. 1, 3 and 4, the edge 50 thereof clamps the guide member 48 in position. Thus, in order to adjust the guide member to accommodate work pieces of different widths or to locate the printed matter at a different position laterally, it is only necessary to lift the table 29 slightly, then move the guide member 48 to its desired position and then lower the table to clamp the guide member firmly in place. It will be understood, however, that an automatic work piece feeder may be used in conjunction with the machine of the present invention.

In order to close the machine into a compact unit, when it is not in use, the guide member 48 is removed and stored on the inclined portion of the deck plate 22, the card collecting tray 31 is swung upwardly to rest on the cross bar 26 as indicated at 31a in FIG. 7, the work piece table is swung into the position indicated at 29a to constitute a portion of a top cover or closure, the collecting hopper 32 is swung to the position indicated at 32a to constitute the remaining portion of the top cover and side cover members 51, 51 are applied to the side frame plates 20 and 21 by means of bottom brackets 52, 52 and a top snap fastener 53 as indicated in FIGS. 1 and 7. Thus, a completely enclosed compact portable unit adapted for convenient use on a table or desk 54 is provided.

Having described the general physical relationship of certain of the components of the invention, the operating units and their respective functions in the operation of the machine will now be described in detail.

A work piece, such as an envelope W, is placed on the work piece table 29 and a stack of master cards C is placed in the card carrier 30 with the printed area face down. A main starting switch 60 is then closed to start a motor M, in counter-clockwise rotation, to drive a sprocket 61, rotatably mounted on a stub shaft 62, by means of sprocket 63 and chain 64.

A gear 65 is secured to sprocket 61 to rotate therewith, which gear meshes with a gear 66 in turn meshing with gears 67 and 68. Gear 68 meshes with gear 69 which in turn meshes with gear 70. Gears 66 and 69 are mounted on stub shafts and gears 70, 68 and 67 are respectively mounted on transverse shafts 71, 72 and 73 carrying feed rolls 74, 75 and 76 which project through openings in the deck plate 22 as clearly shown in FIG. 4. It will be seen that through this train of gears the three feed rolls are rotated in a counterclockwise direction.

The gear 69 is a compound gear with its gear 77 in mesh with an idler gear 78 in turn meshing with a gear 79 mounted on a transverse shaft 80 carrying a crank disc 81 and trip collar 82 to be later described.

The gear 79 is drivingly connected to and disconnected from the shaft 80 by means of a clutch 83 of the coil spring type, such as the clutch 84 shown in FIG. 8. When the machine is first started by closing the switch 60, the clutch 83 is disengaged so that the gear 79 rotates idly on the shaft 80.

The gear 79 meshes with a larger gear 90 mounted on a stub shaft which meshes with a gear 91 mounted on a stub shaft 92 and under control of the clutch 84 which clutch at this stage of operation is disengaged so that gear rotates freely on the stub shaft 92.

Associated with the feed rolls 74 and 75 is a nip roll unit 95 comprising a frame 96, a nip roll 97 cooperating for feed of a work piece with the feed roll 74, a pair of nip rolls 98, 98 cooperating with the feed roll 75 for further feed of the work piece, and spring finger 99 for holding the work piece down against the deck 22. This unit is readily removable from the machine, for example, in the event of a work piece becoming jammed. It is provided with spaced side positioning members 100 adapted to straddle a fixed bracket 101 carried by the cross bar 27. The members 100 are flared at 102 to readily guide the unit into operative position when it is being re-inserted in the machine.

The bracket 101 is provided with a pivot pin 103 for pivotally mounting forked lever 104 carrying a moistening roll 105 at one end in a location directly above the feed roll 75. This is identified herein as the solvent station S. The other end of the lever 104 is provided with a spring for spring loading the moistening roll. However, in the stage of operation being described, the moistening roll is prevented from moving down to its moistening position by means of a pin 106 carried by the collar 82 on the shaft 80 which is being contacted by the free end of the lever 104. The lever 104 carries a holder 107 for a wick 108 leading from the holder into a tube 109 extending laterally from a well 110 in which a solvent container 111 having a flow ball is located. The wick is in contact with the periphery of the moistening roll to apply solvent thereto.

Located next in the path of travel is the printing station P the parts of which are supported from the cross bar 26 by fixed brackets 115 and including a printing roll 116 rotatably mounted in a support member 117 which is pivotally carried by the brackets 115. The support member is spring biased by a spring 118 to urge the printing roll 116 into pressure-applying relation with the feed roll 76.

The card carrier 30 above referred to is inclined as clearly seen in FIG. 4 and the master cards C located therein are weighted by means of a weight 120 and have their leading edges in contact with a positioning bar 121 carried by and extending downwardly from the cross bar 26 to a point slightly above the bottom tongue 122 of the carrier. The bar 121 is adjustable up and down and is adjusted so as to leave a gap between the bar 121 and tongue 122 just sufficient to permit only one card at a time to pass through the gap.

The cards are fed through the gap one at a time by a stripper plate 123 slidably mounted in the base plate 42 for back and forth movement and having a very shallow shoulder 124 which engages the trailing edges of the card to be dispensed on the forward stroke of the stripper plate. Back and forth movement is imparted to the stripper plate by means of the crank pin of the crank disc 81 and connecting link 125.

The dispensed card is next gripped in the nip of the feed roll 76 and printing roll 116 and is forced into pressure-applying relation with an advancing work piece to accomplish the print transfer.

As the master card continues in its travel, it is guided in an upward curved path, as seen in FIG. 14, by laterally spaced arcuate strips 126 and then engages a pair of spaced final feed rolls 127, 127 which are driven by a belt connection 128 with the printing roll shaft and when the trailing edge of the card leaves the rolls 127, 127, it is deposited into the card collecting tray 31. Successive cards are deposited one after the other in the collecting tray in a stack in the same order as the original stack.

As the work piece leaves the printing station, its leading edge first engages the rear wall of the card tray 31 and then is deflected downwardly as seen in FIG. 14, for final discharge into the collecting hopper 32.

It is to be observed that due to the fact that the clutches 83 and 84 are disengaged at the time of closing the starting switch 60 to start the machine, the moistening roll 105 is held out of moistening position and the crank drive for the master card stripper plate 123 is inactive. However, the three feed rolls 74, 75 and 76, the nip rolls 97 and 98, the printing roll 116 and the final card feed rolls 127 are rotating.

When a work piece W is inserted into the nip of the rolls 74 and 97, the work piece advances and passes under the spring finger 99 and depresses the actuator button 130 of the control switch 131. Actuation of the switch 131 energizes a solenoid 132 (FIGS. 1 and 8) to retract the core 133 and thus release the end 84a of the coil spring of the clutch 84. Release of this spring engages the clutch to drivingly connect the gear 91 to the coaxial notched wheel 135. A latch 136 is engaged in a notch of the wheel 135 to rotate therewith. As the gear, notched wheel and latch rotate, the latch engages and triggers a pivoted trigger arm 137 to release the clutch 83 to clutch engaging position to drivingly connect the gear 79 to the shaft 80.

Rotation of the shaft 80 causes the pin 106 of collar 82 to leave the forked lever 104 thus allowing this spring loaded moistening roll 105 to lower and engage the work piece to apply solvent thereto, it being noted that by this time the leading edge of the work piece had passed beyond the solvent station. The amount of advance of the work piece before the moistening roll is lowered to a solvent-applying position may be altered as desired by adjusting the position of the latch 136 on the notched wheel 135. As shown in FIG. 8, this adjustment is effected by means of an adjusting knob 138 secured on a central spindle 139 to the other end of which the latch is fastened. The spindle is spring loaded to hold the latch in notch engaging position. To make an adjustment, the knob is first pressed in to release the latch from the notched wheel and then is turned to rotate the latch to its desired radial position of adjustment after which the knob is released. Since the selected radial position of the latch controls the time at which the moistening roll is lowered to apply the solvent, it is apparent that the area to which the solvent is applied to the work piece may be altered as desired.

When the engaged clutch 83 has rotated to the point where the projecting end 83a of the clutch spring engages the trigger arm 137, the clutch is disengaged and the collar pin 106 has rotated to its position of raising the moistening roll way from the work piece as shown in FIGS. 13, 14 and 15.

It will be observed that since the crank disc 81 is secured on the shaft 80, its control is also under influence of the clutch 82 in the same manner as the trip collar 82. Thus, upon engagement of the clutch 83, the tripper plate 123 is first moved upwardly to the position shown in FIG. 12 and then downwardly to advance the lowermost master card of the stack to the nip of the printing roll 116 and feed roll 76 as shown in FIG. 13. The stripper plate then remains in the downward position until the next work piece is inserted in the machine.

During the time that the master card is being advanced to the printing station, the work piece also was being advanced to the printing station by the nip of the rolls 98 and 72 as seen in FIG. 13, so that as the card and work piece pass through the printing station, the card and work piece are firmly pressed together and the moistened imprint area of the work piece is engaged by the printed matter on the master card so as to transfer the printed matter onto the work piece.

The location of the printed matter on the work piece can be selectively varied by adjusting the latch 136 in the manner above described.

After passing through the printing station P the master card is dispensed to the card collecting tray 31 and the work piece is dispensed to the work piece hopper 32 in the manner above described and illustrated in FIGS. 14 and 15.

In accordance with the present invention, means are also provided to feed cards from the card carrier 30 without feeding a work piece through the machine. In some instances, it may be desirable to selectively print onto work pieces material contained on the cards. In this instance, the cards will be coded in some suitable manner, for example, by having color coded strips on the bottom or imprint face of the card at the trailing edge of the card. For example, various cards with various types of information or containing selected groups of names on a master mailing list may be coded by having a color strip of one color on each of the cards. Other cards containing different groups of names on the same mailing list may be coded with a different color and these two groups of cards arranged in the mailing list in a manner not in accordance with the particular information contained on the card. The operator of the machine may want to transfer information from only one group of the color coded cards in the entire list onto work pieces. To accomplish this, a manually operated switch 140 is provided on the side of the machine in a position readily accessible to the operator. Additionally, an opening 141 is provided in the base plate 42 with a mirrored surface 143 on the lower surface of a piece of glass 142 or other transparent material held in the opening 141. The opening 141 partially overlaps the trailing edge of the stack of cards in the card carrier permitting the operator to view the color strip on the lowermost card in the stack. To feed a card without printing onto a work piece, the operator of the machine will close the manually operated switch 140 which is connected in parallel with the control switch 13, thereby energizing the solenoid 132 and actuating the card feed plate to feed cards out of the stack until the operator observes the reflection on the mirrored surface of the desired color code. At this time, the operator will release the manually operated switch and feed a work piece which will trip the control switch 13, thereby feeding a card into registration with the work piece to duplicate the information on the card on the work piece. This procedure will be repeated until all of the desired coded cards are reproduced.

It will be seen from the foregoing that through the practice of the present invention printed matter can be duplicated from a master card to a work piece with selected variation in the position of the printed matter on the work piece by means of simple adjustment of latch and trigger mechanism employing a minimum number of parts. Except for the hand insertion of the work pieces, the machine is entirely automatic. Due to the simple and effective way in which the master cards are handled and fed through the machine, the cards can be handled time after time with a minimum of wear and damage to the cards.

While a particular embodiment of the present invention has been illustrated and described herein, it is not intended to limit the invention to this embodiment and changes and modifications can be incorporated and embodied therein within the scope of the following claims.

I claim:

1. In a duplicating machine for duplicating printed material from a master card to a work piece comprising: a card carrier on said duplicating machine to support a stack of master cards, master card feed means, a work piece feed station, work piece feed means including at least one driven roll at said work piece feed station to feed work pieces into said duplicating machine, said master card and work piece feed means being operable together to bring a master card and work piece into confronting registered relation, pressure-applying means operable to engage the master card and work piece when the same are in said confronting registered relation to bring the master card and work piece into pressure-applying relation to duplicate the printed material of the master card on the work piece, common drive means to drive said master card feed means, work piece feed means and pressure-applying means, the improvement comprising: a card feed drive train from said common drive means to said master card feed means including a normally disengaged card feed clutch adapted when engaged to activate said card feed means and a normally disengaged adjustable timing clutch operatively associated with said card feed clutch, trip means for said timing clutch operable when tripped to cause engagement of said timing clutch, switch means at said work piece feed station operable upon engagement with a work piece at said work piece feed station to actuate said trip means, a rotatable latch carried by said timing clutch and rotatable upon engagement of said timing clutch to a position into contact with said card feed clutch to cause engagement of said card feed clutch, and means adjustably mounting said rotatable latch relative to said timing clutch to provide an adjustable time delay between engagement of said timing clutch and engagement of said card feed clutch.

2. A duplicating machine in accordance with claim 1 wherein an adjusting knob is provided on said machine, a drive connection between said adjusting knob and said rotatable latch to permit selective adjustment of the position of said rotatable latch relative to said timing clutch.

3. A duplicating machine in accordance with claim 1 including a solvent applicator means to apply solvent to the work piece, said solvent applicator means mounted for movement into and out of a solvent applying position, and means to move said solvent applicator means into said solvent applying position upon engagement of said card feed clutch.

4. A duplicating machine in accordance with claim 1 wherein the switch means actuated by the work piece to actuate said trip means includes a first switch positioned in the path of travel of the work piece at said work piece feed station, and a second manually operated switch operable independently of the first switch to actuate said trip means.

5. A duplicating machine in accordance with claim 4 wherein a bottom wall is provided in said card carrier on which said master cards are supported, means in said bottom wall partially overlying the trailing edge of the lowermost card in said card carrier to permit a reflection of the surface of said portion of the trailing edge of the lowermost card in said card carrier to be viewed by the operator of the machine to permit the operator of the machine to selectively actuate said manually operated switch means in accordance with indicia the operator might see on the portion of the trailing edge of said lowermost card.

References Cited
UNITED STATES PATENTS

| | | | |
|---|---|---|---|
| 1,564,221 | 12/1925 | Duncan | 101—322 X |
| 2,054,344 | 9/1936 | Storck | 101—52 |
| 2,122,536 | 7/1938 | Payne | 101—95 |
| 2,399,890 | 5/1946 | Pott | 101—95 X |
| 2,766,685 | 10/1956 | Sauerman | 101—53 |
| 2,771,838 | 11/1956 | Federwitz | 101—53 |
| 2,908,220 | 10/1959 | Eichenbaum et al. | 101—132.5 |
| 3,053,176 | 9/1962 | Shepherd | 101—132.5 |
| 3,230,871 | 1/1966 | Kooch et al. | 101—53 |
| 3,245,342 | 4/1966 | Wright | 101—322 X |
| 3,320,878 | 5/1967 | Mitchell | 101—322 X |

WILLIAM B. PENN, *Primary Examiner.*